May 27, 1947.  E. W. BARNHART  2,421,139
DUAL STEERING MECHANISM
Filed Sept. 4, 1944
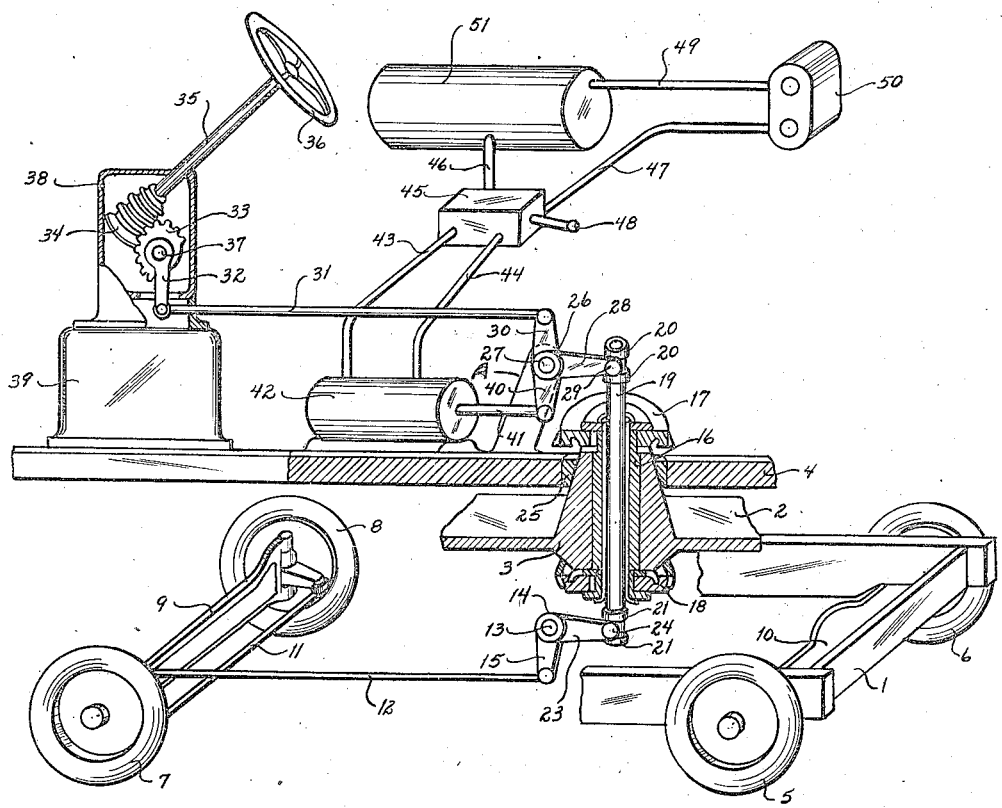
INVENTOR.
EDGAR W. BARNHART
BY Alfred F. Rees
ATTORNEY.

Patented May 27, 1947

2,421,139

UNITED STATES PATENT OFFICE 2,421,139

DUAL STEERING MECHANISM

Edgar W. Barnhart, Marion, Ohio, assignor to
The General Excavator Company, Marion, Ohio,
a corporation of Ohio Application September 4, 1944, Serial No. 552,697

18 Claims. (Cl. 180—79.2)

This invention relates to portable hoists or excavators and in its more specific aspects relates to an improved steering mechanism therefor.

One of the objects of the invention is to provide a portable hoist or excavator with a steering mechanism that is either manually or power operated and so organized that the manual mechanism may supplement or boost the power mechanism or vice versa.

Another object of the invention is the provision of a steering mechanism for a portable hoist or excavator in which two independently operable steering mechanisms are effective on a common actuator or linkage and in which one mechanism is power operated and the other is manually operated.

A still further object of the invention is the provision of a dual steering mechanism disposed in the rotatable upper body of a portable hoist or excavator, each of which devices is severally or jointly operable in any rotated position of the upper body to effect a steering of the machine and in which the one device supplements the other.

A still further object of the invention is the provision in a portable hoist or excavator of selectively operable steering mechanisms both acting on the same device and in which one mechanism is manually operable and the other is motor operated, said devices severally or jointly operable.

Another and still further object of the invention is the provision in a dual steering mechanism of a linkage means enabling the individual components of the mechanism to operate independently of each other, jointly or in which the one component may boost or supplement the other.

Other and further objects of the invention will occur to those skilled in the arts to which this invention relates as the description proceeds which, taken in connection with the accompanying drawing, sets forth a preferred embodiment of the invention but such disclosure is not to be construed as a limitation thereof and any and all modifications, alterations and variations of structure coming within the spirit and scope thereof are deemed to be included herein.

In the drawing:

The figure shows a schematic perspective view of a chassis incorporating the invention.

The development of relatively high speed travel mechanisms for portable cranes, hoists and like structures has necessitated considerable revision of ideas on steering controls and has rendered obsolete the customary type of control so long known in the art. The prior art contains various methods of steering, generally of the selective traction type and some power operated devices. These devices, while possessing certain well defined advantages, have the disadvantage of being left without a steering control in the event of failure of pressure fluid or other power supply or breakdown of the power driven or operated steering device. Hand steering of heavy cumbersome portable cranes or hoists and similar devices per se have not proved successful because of the considerable force required.

The instant invention sets forth a device that incorporates a motor or pressure fluid driven system coordinated with a manual control patterned after the automotive steering device and which is so coordinated with the hoist or crane steering mechanism that it may be actuated by either the hand device or by the motor operated device. This device retains all the advantages of the pressure fluid or other type of motor operated steering and should the latter fail, it is possible for the operator to manually control the steering even though the more desirable and easily handled power-operated portion thereof has been incapacitated. Both devices are operable in any rotated position of the deck or upper body relative to the chassis when used on a portable hoist or excavator.

The above objects and advantages are set forth in a structure disclosed in the accompanying drawing in which I is a portion of the chassis frame of a portable hoist, crane or excavator on which is supported a frame element 2 having a gudgeon or journal element 3 thereon for rotatably supporting a deck element 4 constituting a portion of the upper body (not shown). It is to be understood that whenever the term "deck" occurs in this description and in the appended claims its meaning is regarded synonymous with the terms "upper body" and is to be construed as such.

The chassis frame is supported on rear wheels 5 and 6 and on forward wheels 7 and 8 which are shown as being of the automotive type. A more detailed explanation of the organization of the pivoted construction is shown in copending application Serial No. 504,198, filed September 30, 1943, entitled Steering mechanism for portable hoists and excavators, now Patent No. 2,417,963, March 25, 1947. Axles 9 and 10 support the wheels for rotation and the frame 1 is normally supported on the axles. Each of the forward wheel assemblies is connected by a transverse rod 11 and rod 12 is connected to steering arm bracket (not shown) illustrated in the above identified application. Wheels 7 and 8 may be mounted on an axle of the farm wagon type illustrated in Figs. 11 and 12 in the above identified application. The type of mounting is optional and both are deemed within the purview of this disclosure. The automotive type mounting and the farm wagon type are both regarded as pivotally mounted on the chassis.

Appropriately mounted on a pin 13 fixed to the chassis frame 1 is a bell crank 14 which may be rotatable with or relative to pin 13. The rod 12 is pivotally secured to arm 15 of the bell crank 14 and the latter is adapted to move rod 12 axially of itself to thereby twist the wheels 7 and 8 and steer the hoist or crane device.

Centrally disposed in the gudgeon or journaling means 3 is a hollow shaft 16 rotatable relative thereto and which has, on each end thereof, gears 17 and 18, the latter to be connected to the drive shafts customarily associated with axle 10. Disposed within the hollow shaft 16 is a movable bar or rod element 19 which constitutes one of the links of the steering mechanism which is freely slidable therein. Arranged on each end thereof are a pair of collars 20, 20 and 21, 21 one set of which engages arm 23 of bell crank 14 and causes same to move with respect thereto. A conventional pin and roller connection 24 associates arm 23 with the collars 21, 21 on rod 19.

It was previously indicated that deck 4 is rotatably supported on gudgeon 3 and to facilitate such rotation, a bearing bushing 25 may be provided. Fixed to the deck 4 and rotatable relatively thereto is a T crank 26 which is supported on a pin 27 rigidly fixed to or supported on deck 4. One arm 28 thereof is provided with a pin and roller connection 29 engageable with collars 20, 20 on bar or rod 19. This connection enables the deck 4 and the parts or fixtures supported thereon, such as the T crank 26, to rotate as a unit with respect to the rod 19.

A second arm 30 of the T crank 26 has pivotally connected thereto a rod 31 which at its other end is pivotally connected to an arm 32 rigidly secured to a segment of a worm wheel 33 rotatably mounted on a shaft 37 arranged in a housing 38. Worm wheel 33 is rotated by worm 34 rigidly secured to one end of the column on shaft 35 and to the other end of the said shaft, a steering wheel 36 is secured. The housing 38 may be conventional in character and is preferably supported on an auxiliary base 39 on deck 4. The use of base 39 is optional and its employment depends upon varying factors and is not strictly essential in the practicing of the invention. Gears 33 and 34 could be of the spur or bevel type or a combination thereof.

The third arm 40 of the T crank 26 has appropriately pivotally connected thereto the plunger or piston rod 41 of pressure fluid motor or cylinder 42, the latter being appropriately fixed to deck 4. Motor 42 is supplied with pressure fluid by means of conduits 43 and 44 that lead to opposite sides of the piston (not shown) within motor or cylinder 42. These conduits are connected to one side of a reversing valve 45 controlled by lever 48. A source of pressure fluid supply 51 is connected to one side of the valve 45 by means of conduit 46. The pressure fluid supply 51 is connected to the exhaust side of pump 50 by means of conduit 49 and the pump 50 is connected on its intake side with valve 45 by means of conduit 47, the latter forming the exhaust side of motor or cylinder 42.

The operation of this device is based upon the fact that wheels 7 and 8 may be suitably pivoted on axle 9 with respect to frame 1 by either steering wheel 36 or motor 42. Under ordinary circumstances it is considered that motor 42 will constitute the principal steering mechanism and when doing so, lever 48 will be actuated to produce the proper direction of motion in rod 41. The hand device 36 will simultaneously rotate in a direction depending upon the direction of motion of rod 41. When hand wheel device 36 is rotated, rod 41 will also move. The foregoing motion results because element 26 is pivoted with respect to the deck 4 on pin 27.

That which is regarded novel and useful and which is sought to be protected by Letters Patent of the United States is:

1. In a self-propelled vehicle; a chassis having a pair of shiftable wheels thereon; a rotatable deck; a center shaft and supporting element about which said deck is rotatable; an axially movable rod extending through said center shaft; means connecting said rod and said forward wheels to pivot same and steer said chassis when said rod is axially moved; and means on said deck to axially actuate said rod which includes a motor device and a manually operated device, each of said devices connected to said rod such that said devices may selectively actuate same.

2. In a self-propelled vehicle; a chassis having forward pivoted wheels thereon; a rotatable deck; means to rotatably support said deck on said chassis; a rod extending through said means operatively associated with said forward pivoted wheels; a manually operated device on said deck; a motor device on said deck; and means on said deck associated with said rod connected to said manually operated device and to said motor, said means transmitting force originating in either said device or said motor to actuate said rod to thereby steer said chassis.

3. In a self-propelled vehicle; a chassis having pivoted forward wheels thereon; a rotatable deck on said chassis; a journal supporting said deck on said chassis; a rod disposed substantially concentrically of said journal; means connecting said rod and said pivoted wheels; means on said deck to actuate said rod which includes a motor and a control therefor and a manually operable means; and means supported on said deck to connect said motor and said manually operable means to said rod, said motor and said manually operable means each adapted to selectively actuate said rod without regard to the other to thereby pivot said forward wheels.

4. In a self-propelled vehicle; a chassis; pivoted forward wheels on said chassis to steer same; a deck; means to rotatably support said deck on said chassis; an axially movable rod disposed substantially concentrically to said means; means connecting said rod and said wheels; a motor means to axially actuate said rod; a manual means to axially actuate said rod; and means supported on said deck connecting each of said actuating means with said rod such that said rod may be selectively axially actuated by either of said actuating means to pivot said wheels with respect to said chassis.

5. In a self-propelled vehicle; a chassis having pivoted forward wheels thereon; a deck; a first means to rotatably support said deck on said chassis; a second means extending axially of said means; a third means connecting said second means and said pivoted forward wheels; a manually operable steering mechanism on said deck; a pressure fluid motor on said deck; and means supported on said deck connected between said second means and each of said deck mounted mechanism and motor to enable each of them to selectively actuate said second means to thereby pivot said forward wheels to thereby steer said chassis.

6. In a self-propelled vehicle; a chassis having pivoted forward wheels thereon; a deck; means supporting said deck for rotation relative to said chassis; a rod reciprocably mounted in said means and for relative rotation with respect thereto; means connecting said rod and pivoted forward wheels; a multiple arm crank mounted on said deck, one of whose arms is engageable with said rod; a hand operated device connected to another arm of said crank; and a motor connected to the other arm of said crank, said hand operated device and motor so organized and arranged that each may selectively reciprocate said rod to pivot said forward wheels to thereby steer said chassis.

7. In a self-propelled vehicle; a chassis having pivoted forward wheels thereon; a deck; a first means to rotatably support said deck on said chassis; and a second means to pivot said forward wheels relative to said chassis by mechanism mounted on said deck and operable in any rotative position of said deck relative to said chassis which includes a rod reciprocably arranged in said first means operatively connected to said wheels, a motor means and a manually operable means connected to said rod to enable said rod to be selectively reciprocated by said motor or said manually operable means.

8. In a self-propelled vehicle; a chassis having pivoted forward wheels; a deck; means to rotatably mount said deck on said chassis; a rod extending through said means; means connecting said rod and said wheels; a T crank rotatably mounted on said deck one leg of which engages said rod; a steering wheel mechanism connected to a second leg of said crank; a motor connected to the third leg of said crank; and said motor and said steering wheel each adapted to selectively actuate said rod in any rotative position of said deck relative to said chassis.

9. In a steering mechanism for a self-propelled vehicle; a chassis having pivoted wheels on the forward end thereof; a deck; means to rotatably mount said deck on said chassis; a rod axially movable in said means; a worm and wheel steering mechanism mounted on said deck; a pressure fluid motor mechanism mounted on said deck; a T crank device connecting said worm and wheel and said motor with said rod, each of said mechanisms adapted to selectively actuate said rod; and means connecting said rod and said pivoted wheels to pivot same when said rod is moved axially in said means by either of said mechanisms.

10. In a steering mechanism; a chassis having pivoted wheels thereon; a deck; means to rotatably support said deck on said chassis; a rod axially movable in said means operatively connected to said pivoted wheels; a crank pivotally mounted on said deck associated with said rod; a wheel operated geared steering mechanism on said deck operatively associated with said crank; a motor mechanism operatively associated with said crank; said crank transmitting motion originating in either mechanism and imposing axial motion on said rod to thereby steer said chassis; and said mechanisms being jointly and severally operable on said crank.

11. In a self-propelled vehicle; a chassis having a pair of pivotable wheels thereon; a deck element; means to rotatably support said deck on said chassis; a rod extending through said means operatively associated with said pivoted wheels; a manually operated device on said deck; a motor device on said deck; and means mounted on said deck connecting said rod, said manually operated device and said motor device to selectively apply force originating in either of said devices to actuate said rod to steer said chassis in any rotative position of said deck relative to said chassis.

12. In a self-propelled vehicle; a chassis having a pair of shiftable wheels thereon; a deck element; means including a center shaft to rotatably support a deck on said chassis; a rod in said center shaft; means connecting said rod and said shiftable wheels; and means on said deck to actuate said rod to shift said shiftable wheels in order to steer said chassis which includes a motor device and a manual device and means operatively supported on said deck to connect each of said devices with said rod and operable in any rotative position of said deck with respect to said chassis.

13. In a self-propelled vehicle; a chassis; pivoted wheels on said chassis to steer same; a deck; means to rotatably support said deck on said chassis; a rod disposed substantially concentrically of said means; means connecting said rod and wheels and including means to transmit motion from said rod to said means; a motor device on said deck; a manually operable device on said deck; and means operatively supported on said deck connecting the output sides of said motor and manual devices to said rod to actuate same, said last mentioned means selectively allowing joint or several operation of said devices.

14. In a self-propelled vehicle; a chassis having pivoted wheels thereon; a deck; a first means to rotatably support said deck on said chassis; a second means extending axially of said first means; a third means connecting said second means and said pivoted wheels; a manually operable steering device on said deck; a pressure fluid operated steering motor on said deck; and means rotatably supported on said deck to connect the output sides of said motor and said manually operable device with said second means enabling joint or selective actuation of said second means by said motor or said manually operable device to steer said chassis.

15. In a self-propelled vehicle; a chassis having pivoted wheels thereon; a deck; means supporting said deck for rotation relative to said chassis; a rod disposed within said means; means connecting said rod and said pivoted wheels; a crank pivotally mounted on said deck, one arm of which is operatively associated with said rod; a manually operable steering device mounted on said deck; a steering motor mounted on said deck; the output sides of said motor and said steering device connected to said crank to transmit motion originating in said motor and in said manual device to said rod to actuate same and pivot said wheels; and said manual device being selectively or jointly operable on said crank to facilitate the steering of said chassis in any rotative position of said deck relative to said chassis.

16. In a self-propelled vehicle; a chassis having pivoted wheels thereon; a deck; a first means to rotatably support said deck on said chassis; a rod in said first means operatively connected to said pivoted wheels; a second means pivoting said pivoted wheels on said chassis; means on said deck to pivot said pivoted wheels in any rotative position of the deck relative to said chassis which includes a manually operable steering mechanism, a steering motor, and means rotatably mounted on said deck connecting the output sides of said manually operable steering mechanism and said motor with said rod to transmit motion originating in said motor and said mechanism to said rod to steer said chassis; and said steering motor and said manually operable steering mechanism being severally or jointly operable.

17. In a self-propelled vehicle; a chassis having pivoted wheels; a deck; means to rotatably mount said deck on said chassis; a rod extending through said means; means connecting said rod to said pivoted wheels to transmit motion from said rod to said pivoted wheels; a crank pivotally mounted on said deck operatively associated with said rod; a steering wheel mechanism and a steering motor mounted on said deck, the output sides thereof operatively connected to said crank; said crank transmitting motion originating in either said mechanism or said motor to said rod to thereby steer said chassis; and said mechanism and said motor being severally or jointly operable on said crank and in any rotative position of said deck relative to said chassis.

18. In a steering mechanism for a self-propelled vehicle; a chassis having pivoted wheels thereon; a deck; means to rotatably mount said deck on said chassis; a rod in said means; means connecting said rod and said pivoted wheels; a geared steering wheel mechanism on said deck; a steering motor mounted on said deck; a crank pivotally mounted on said deck; said crank operatively associated with said rod and with the output sides of said motor and said steering wheel mechanism; said crank transmitting motion originating in said steering wheel mechanism or in said motor to said rod to pivot said wheels to steer said chassis; and said motor and said steering wheel mechanism being jointly or severally operable on said crank.

EDGAR W. BARNHART.

REFERENCES CITED

The following references are of record in the file of this patent:

UNITED STATES PATENTS

| Number | Name | Date |
| --- | --- | --- |
| 2,126,404 | McLean | Aug. 9, 1938 |
| 1,910,600 | Fitch | May 23, 1933 |
| 2,151,998 | Stelzer | Mar. 28, 1939 |
| 2,112,962 | Hug | Apr. 5, 1938 |
| 1,648,917 | Schvartz | Nov. 15, 1927 |
| 1,717,757 | Brey | June 18, 1929 |
| 2,291,626 | Huber | Aug. 4, 1942 |
| 1,748,041 | Backhus | Feb. 18, 1930 |